United States Patent [19]

Bailly et al.

[11] Patent Number: 4,960,741
[45] Date of Patent: Oct. 2, 1990

[54] ZIEGLER-NATTA CATALYST

[75] Inventors: Jean-Claude A. Bailly; Stylianos Sandis, both of Lavera, France

[73] Assignee: BP Chemicals Limited, London, United Kingdom

[21] Appl. No.: 313,467

[22] Filed: Feb. 22, 1989

[30] Foreign Application Priority Data

Mar. 3, 1988 [FR] France ................ 88 02900

[51] Int. Cl.$^5$ .................... C08F 4/02; C08F 4/649
[52] U.S. Cl. .......................... 502/10; 502/9; 502/104; 502/111; 502/121; 502/122; 502/123; 502/124; 502/125; 502/126; 502/127; 526/125
[58] Field of Search ............... 502/9, 10, 104, 111, 502/121, 122, 123, 124, 125, 126, 127

[56] References Cited

U.S. PATENT DOCUMENTS

| 4,384,984 | 5/1983 | Mink et al. ............. 502/104 X |
| 4,399,054 | 8/1983 | Ferraris et al. ............. 502/125 |
| 4,442,224 | 4/1984 | Takitani et al. ............. 502/122 X |

FOREIGN PATENT DOCUMENTS

| 0098196 | 1/1984 | European Pat. Off. . |
| A0132893 | 2/1985 | European Pat. Off. . |
| 2434180 | 3/1980 | France . |
| 0099773 | 2/1984 | France . |
| 2000514 | 1/1979 | United Kingdom . |

OTHER PUBLICATIONS

Journal of Macromolecular Science—Reviews in Macromolecular Chemistry & Physics, vol. C24, No. 3, 1984, pp. 355-386. Marcel Dekker, Inc., New York, U.S., C. Dumas. Supported Propylene Polymerization Catalyst.

*Primary Examiner*—Patrick P. Garvin
*Attorney, Agent, or Firm*—Brooks Haidt Haffner & Delahunty

[57] ABSTRACT

A process of the Ziegler-Natta type is prepared using a preactivated support containing (A) from 80 to 95 mol % of magnesium chloride and (B) 5 to 20 mol % of at least one electron donor compound which contains no labile hydrogen and no ester function; the preactivated support consisting of spherical particles having a mass average diameter, Dm of 10 to 100 microns and a particle size distribution Dm/Dn of less than 2. The catalyst is prepared by (i) treating the preactivated support with at least one electron donor compound containing labile hydrogen, (ii) treating the resulting activated support with at least one ester of an aromatic acid, (iii) impregnating the treated support with titanium tetrachloride and (iv) after washing the impregnated catalyst activating it with titanium tetrachloride. The catalyst has a high titanium content and a high activity when used to polymerize olefins.

10 Claims, No Drawings

ZIEGLER-NATTA CATALYST

The present invention relates to a supPorted catalyst for polymerization of olefins of the Ziegler-Natta type, to a support consisting of spherical particles of magnesium chloride used for this catalyst, and to a process for preparing this catalyst. The catalyst has an extremely high activity in the polymerization of olefins and a highly stereospecific nature for polymerizing propylene.

It is known that catalyst systems of the Ziegler-Natta type consist of the combination of a catalyst comprising at least one compound of a transition metal such as titanium, and of a cocatalyst comprising at least one organometallic compound of a metal such as aluminium. It is known, furthermore, that the properties of these catalysts can be greatly influenced when the transition metal compound is employed with a support consisting of a solid inorganic compound such as magnesium chloride. In the technique for preparing a supported catalyst, the properties of the support and the process for preparing the catalyst, which generally consists in fixing the transition metal compound onto the said support, are of very great importance for the characteristics of the catalyst.

According to European Pat. Application EP-A-0,098,196, it is known to prepare a catalyst support comprising spheroidal particles based essentially on magnesium chloride and containing an electron-donor compound in a small quantity, generally less than 3% on a molar basis relative to the magnesium chloride. EP-A-0,099,773 discloses a catalyst prepared by treating such a support with an aromatic ether or an ester of an aromatic acid, and then by impregnating the said support with titanium tetrachloride, so that the catalyst contains from 0.5 to 3% of titanium atoms per atom of magnesium.

It is found that this catalyst is able to produce polyolefins and more particularly polypropylene having a residual titanium content which is not less than 5 ppm and hence the polymerization efficiency does not exceed approximately 2 kg of polymer per gram of catalyst. It is also found that the polymers thus manufactured have a residual chlorine content which is correspondingly higher when the catalyst employed contains little titanium. Furthermore, a polypropylene prepared with this catalyst and having a melt index in the region of 2 g/10 minutes has a content of polymer insoluble in boiling n-heptane which is generally below 93% by weight.

It appears, therefore, that one of the major problems to be solved consists in finding a catalyst supported on spherical particles of magnesium chloride, which has a relatively high titanium content. Another problem consists in developing a catalyst capable of polymerizing olefins with an extremely high efficiency and, consequently, of manufacturing polymers of very low residual catalyst contents, both in respect of titanium and chlorine.

It can be expected, furthermore, that new problems will arise when a catalyst of very high activity is employed. In particular, one of these problems relates to the fact that a catalyst must have a certain ability to withstand the enormous physical stresses due to the growth of the particles during the polymerization. If this growth is extremely fast and reaches a high level, because of this high-efficiency catalyst, it then becomes difficult to avoid bursting of the particles and to preserve the sphericity of the polymer particles. Another problem relates to the fact that the stereospecific nature of a catalyst in the polymerization of propylene generally tends to diminish when the activity of this catalyst increases.

An urgent need has therefore arisen to develop a catalyst capable of manufacturing not only highly crystalline polymers, but also amorphous or elastomeric copolymers. Such a catalyst must, furthermore, be adapted to the requirements of the various industrial processes for polymerizing olefins, and in particular must be adapted both to the suspension processes in a liquid olefin or in a hydrocarbon solvent, and to gas phase processes.

It has now been found that it is possible to prepare a high-efficiency catalyst capable of avoiding, or at least mitigating, the abovementioned disadvantages and of meeting the requirements of the industrial polymerization processes.

The subject of the present invention is consequently a catalyst of the Ziegler-Natta type, capable of being applied to the polymerization of olefins, characterized in that it comprises a preactivated support containing from 80 to 95 mol% of magnesium chloride and from 5 to 20 mol% of at least one electron-donor compound, $D_1$, containing no labile hydrogen and no ester function and consisting of spherical particles which have a mass average diameter of 10 to 100 microns and a particle size distribution such that the ratio of the mass average diameter, Dm, to the number average diameter, Dn, is below 2, the preactivated support which has been successively treated with at least one electron-donor compound, $D_2$, containing labile hydrogen, and then optionally with at least one ester of an aromatic acid, and which, when impregnated with titanium tetrachloride and then subjected to a washing with liquid hydrocarbon and to a treatment of activation with titanium tetrachloride, contains from 4 to 12% of titanium atoms per atom of magnesium.

According to the present invention, it has surprisingly been found that, to prepare a supported catalyst which has a high titanium content and an extremely high activity in the polymerization of olefins, it is essential to use a particular support based on magnesium chloride and preactivated with the aid of an electron donor compound. The preactivated support is characterized in that it contains a relatively large quantity of an electron-donor compound $D_1$, free from labile hydrogen and from ester function. The electron-donor compound, $D_1$, is known as such or as a Lewis base and has a complexing power which is relatively low. The compound $D_1$ is advantageously chosen amongst ethers, sulphones, sulphoxides, thioethers, amines, amides and phosphines. Electron donor compounds containing labile hydrogen, such as water or alcohols, or containing an ester function are expressly excluded. More generally, the electron-donor compounds capable of reacting with alkylmagnesium compounds are excluded. The compound $D_1$ is preferably chosen amongst ethers.

The preactivated support employed for preparing the catalyst of the present invention is characterized in that it contains a relatively large quantity of electron donor compound, $D_1$. This characteristic constitutes one of the essential conditions for subsequently obtaining a supported catalyst which is rich in titanium and which is, furthermore, extremely active in polymerization.

The composition of the preactivated support contains from 80 to 95 mol % of magnesium chloride and from 5 to 20 mol % of the compound $D_1$. More advantageously, it contains from 85 to 90 mol % of magnesium chloride and from 10 to 15 mol % of the compound $D_1$.

It has been found that the best results are obtained when the preactivated support is in the form of a homogeneous composition, that is to say a composition where the compound $D_1$ is distributed homogeneously throughout the magnesium chloride particle, from the core to the periphery of the latter and not only at its periphery. It follows from this that, to obtain a preactivated support of this kind, it is recommended to prepare it by a method using a precipitation.

It has been found, moreover, that the preactivated support yields high-performance catalysts capable of withstanding the enormous growth stresses during the polymerization when it is found the structure of the preactivated support is essentially amorphous, that is to say a structure where all form of crystallinity has substantially disappeared and characteristic X ray diffraction pattern does not exist in a powder. From this it follows that this particular form of the preactivated support can be obtained by a precipitation, preferably carried out under relatively precise conditions.

The preactivated support is, moreover, characterized in that it consists of spherical particles which have a mass average diameter of 10 to 100 microns, preferably from 20 to 50 microns. The particles of the preactivated support have a very narrow particle size distribution, such that the ratio Dm/Dn of the mass average diameter, Dm, to the number average diameter, Dn, is below 2. More particularly, the particle size distribution of these particles may be extremely narrow, such that the ratio Dm/Dn is from 1.1 to 1.5, substantially no particles with a diameter above 1.5×Dm or below 0.6×Dm are noted: the particle size distribution may also be assessed by the fact that more than 90% by weight of the particles in the same single batch are included within the region Dm±10%.

The specific surface area of the preactivated support particles may be from 20 to 100 m²/g (BET), preferably from 30 to 60 m²/g (BET), and the relative density of these particles ranges approximately from 1.2 to 2.1.

The preactivated support employed in the present invention may be prepared particularly by reacting a dialkylmagnesium compound with an organic chlorine compound in the presence of the electron-donor compound, $D_1$. A product of formula $R_1MgR_2$, in which $R_1$ and $R_2$ are identical or different alkyl radicals containing from 2 to 12 carbon atoms, may be chosen as a dialkylmagnesium compound. One of the important properties of this dialkylmagnesium compound is that it is soluble as such in the hydrocarbon medium in which the preparation of the support will be carried out. An alkyl chloride of formula $R_3Cl$ in which $R_3$ is a secondary or, preferably, tertiary alkyl radical containing from 3 to 12 carbon atoms is chosen as an organic chlorine compound. It is preferred to employ an ether of formula $R_4OR_5$ in which $R_4$ and $R_5$ are identical or different alkyl radicals containing from 1 to 12 carbon atoms as an electron-donor compound.

Furthermore, the various reactants employed for preparing the preactivated support is employed under the following conditions:

the molar ratio $R_3Cl/R_1MgR_2$ is from 1.5 to 2.5, preferably from 1.95 to 2.2, and the molar ratio $D_1/R_1MgR_2$ is from 0.1 to 1.2, preferably from 0.3 to 0.8.

The reaction between $R_1MgR_2$ and $R_3Cl$, in the presence of the electron-donor compound, $D_1$, is a precipitation which takes place under stirring, within a liquid hydrocarbon. The specialist knows that, in this case, physical factors such as the viscosity of the medium, the type and rate of stirring and the conditions of use of the reactants are capable, with everything else unchanged, of playing a major part in the form, the structure, the size and the particle size distribution of the precipitated particles. Nevertheless, to obtain the preactivated support employed in the present invention and characterized particularly by an amorphous structure and by the presence of a large quantity of the electron-donor compound, $D_1$, it is recommended to perform the precipitation reaction at a relatively low temperature, ranging from 10° to 50° C., preferably from 15° to 35° C. It is recommended, furthermore, that the precipitation reaction should proceed extremely slowly, over a period of at least 10 hours, preferably a period comprised between 10 to 24 hours, so as to permit a proper organization of the solid product formed, in particular the insertion of a large quantity of the compound $D_1$ and its uniform dispersion in the precipitated solid.

The actual preparation of the catalyst starting from the preactivated support which is thus defined comprises the four successive stages which consist in:

(a) treating the preactivated support with at least one electron-donor compound containing labile hydrogen, $D_2$, in order to obtain an activated support, (b) optionally treating the said activated support with at least one ester of an aromatic acid, (c) impregnating the support thus treated with titanium tetrachloride, then washing the impregnated support with liquid hydrocarbon and (d) subjecting the support thus impregnated and washed to a treatment of activation with titanium tetrachloride.

In the first step, the treatment of the preactivated support is carried out with the aid of an electron donor compound containing labile hydrogen, $D_2$, in order to obtain an activated support, that is to say a support capable of subsequently fixing a large quantity of titanium tetrachloride. This treatment is actually tricky to carry out, because it must make it possible to carry out an exchange reaction between the electron-donor compound, $D_1$, and the electron-donor compound containing labile hydrogen, $D_2$, within the preactivated support, under such conditions that the exchange reaction may be virtually complete, but without modification of the actual structure of the support. In particular, the compound $D_2$ must exhibit a capacity for complexing magnesium chloride which is greater than that of the compound $D_1$. It is completely surprising to find that this treatment can be performed without it being possible to observe any crystallization of the support or some disintegration of the particles.

In particular, this treatment is carried out by placing the preactivated support in contact with the compound $D_2$, which is employed in a quantity of between 0.2 and 1.2 moles, preferably between 0.5 and 1.0 mole per mole of magnesium chloride. Furthermore, it is particularly recommended that the placing in contact be carried out at a temperature of 0° to 50° C., preferably from 10° to 35° C., in order that the exchange reaction may proceed without appreciable modification of the original preactivated support. It is advantageous, furthermore, to carry out this placing in contact with stirring within a liquid hydrocarbon such as n-hexane. In practice, this placing in contact may be performed in various possible ways, for example by slow addition of the compound $D_2$ to the suspension of a preactivated support which is kept stirred in a liquid hydrocarbon. It is generally observed that the compound $D_2$ employed in this treatment is easily fixed into the support and no substantial change in the amorphous structure and in the morphology of the support is revealed. The support thus activated with the compound $D_2$ may be washed once or more times with a liquid hydrocarbon such as n-hexane, before proceeding to the next stage.

The electron-donor compound, $D_2$, containing labile hydrogen is advantageously chosen amongst water, alcohols, phenols, thiols and hydrogen sulphide. An alcohol containing from 1 to 12 carbon atoms is preferably employed. More particularly, the compound $D_2$ is chosen amongst ethanol, propanol, n-butanol, n-pentanol and n-hexanol.

The support thus activated with the electron-donor compound containing labile hydrogen is then optionally treated during a second stage with at least one ester of an aromatic acid. This ester can be chosen for example, amongst ethyl benzoate, methyl paratoluate and dibutyl or diisobutyl phthalate.

The treatment with at least one ester of an aromatic acid is optional for a catalyst to be used for homopolymerisation of ethylene or copolymerisation of ethylene with minor amounts, typically less than 20% by weight, of an alpha-olefin having 3 or more carbon atoms. Catalysts for homopolymerising or copolymerising alpha-olefins having 3 or more carbon atoms are preferably treated with at least one ester of an armatic acid. When used, this treatment is carried out under such conditions that the structure and the morphology of the support are not appreciably modified. In particular, it can be carried out by placing the activated support in contact with the aromatic acid ester in a quantity of between 0.1 and 1.0 mole, preferably between 0.2 and 0.8 mole per mole of magnesium chloride. It is particularly recommended, moreover, to perform this placing in contact at a temperature of 0° to 60° C., preferably from 10° to 50° C., in order that this treatment may proceed without appreciably modifying the original support. Moreover, this placing in contact can be carried out with stirring within a liquid hydrocarbon such as n-hexane. In practice, the placing in contact may be performed in various possible ways, in particular by slow addition of the aromatic acid ester to the suspension of activated support kept stirred in a liquid hydrocarbon. If necessary, the support thus treated may be washed one or more times with a liquid hydrocarbon such as n-hexane, before proceeding to the next stage.

In the third stage, the support optionally treated with the aromatic acid ester is impregnated with titanium tetrachloride, which may be employed pure or in solution in a liquid hydrocarbon such as n-hexane. This impregnation can be performed by placing the support in contact with titanium tetrachloride in a quantity of between 1 and 25 moles, preferably of between 2 and 20 moles per mole of magnesium chloride. It is recommended, moreover, that the impregnation be performed at a temperature ranging from 20° to 130° C., preferably from 70° to 120° C., in order that the support may retain a relatively amorphous structure which enables it to properly withstand the high growth stresses during the polymerization. It is preferred, moreover, to perform this impregnation with stirring and within a liquid hydrocarbon such as n-hexane. In practice, the impregnation may ba performed in various ways, in particular by addition of titanium tetrachloride in the support suspension, kept stirred, in a liquid hydrocarbon and by keeping the mixture thus obtained stirred for a period ranging from 0.5 to 10 hours, preferably from 1 to 4 hours. The support thus impregnated is washed one or more times with a liquid hydrocarbon such as n-hexane, before proceeding to the next stage. During the washing, titanium tetrachloride not impregnated in the support is eliminated with other products, such as the electron-donor compound $D_2$.

It is found, surprisingly, that from this impregnation stage onwards, the solid obtained after impregnation contains a large quantity of titanium, ranging from 4 to 12% of titanium atoms per atom of magnesium. Furthermore, the electron-donor compound containing labile hydrogen, $D_2$, which was initially present in the activated support has virtually disappeared from this solid during the impregnation and the washing.

In the last stage, the impregnated support is subjected to a treatment of activation with titanium tetrachloride, a treatment which is important according to the present invention for preparing a catalyst with an extremely high activity in the polymerization of olefins. To give an indication, it is estimated that this activation treatment enables the activity of the catalyst to be increased by a factor of two or three. The effect of this activation stage is all the more astonishing, since the morphology and the particle size of the catalyst thus obtained are appreciably identical with those of the preactivated support initially employed.

The activation treatment consists in placing the titanium-impregnated solid in contact with titanium tetrachloride, employed pure or in solution in liquid hydrocarbon such as n-hexane. The quantity of titanium tetrachloride which is employed is from 1 to 25 moles, preferably from 2 to 20 moles per mole of magnesium chloride. It is recommended, moreover, to perform the placing in contact at a temperature of 20° to 130° C., preferably from 70° to 120° C. It is preferred to perform the activation stage with stirring , within a liquid hydrocarbon such as n hexane. In practice, the placing in contact may be performed in various ways, in particular by adding titanium tetrachloride to the suspension of titanium-impregnated solid in a liquid hydrocarbon and by keeping the mixture thus obtained stirred for a period ranging from 0.5 to 10 hours, preferably from 1 to 4 hours. The solid thus treated is washed one or more times with a liquid hydrocarbon such as n-hexane. The activation treatment may consist of one or more placings in contact of this type.

It is particularly astonishing to find that the effect of the activation treatment is not to appreciably increase the titanium content of the catalyst, which is already high, but that its main effect is to considerably increase the activity of the catalyst during polymerization.

The solid catalyst prepared according to the present invention consists of particles whose physical properties such as the spherical form, the mass average diameter and the particles size distribution, are virtually identical with those of the particles of the original preactivated support, from which they are derived. The catalyst contains from 4 to 12%, preferably from 5 to 10% and more particularly from 6 to 9% of titanium atoms per atom of magnesium.

The catalyst thus obtained is employed in the polymerization of olefins in combination with a cocatalyst, which is generally chosen from organoaluminium, organomagnesium or organozinc compounds. Generally, one or more organoaluminium compounds, chosen amongst trialkylaluminiums or alkylaluminium halides, are employed. In the particular case of propylene polymerization or co-polymerization, an organoaluminium compound, preferably a mixture of trialkylaluminiums and alkylaluminium halides, is employed in combination with an electron-donor compound chosen amongst aromatic acid esters and organic silicon compounds such as silane derivatives. In particular, when the activated support has been treated with a phthalic acid ester, it is preferred to employ, as a cocatalyst, one or more organoaluminium compounds combined with an organic silicon compound. In all cases, when the combination of organoaluminium compounds with an electron-donor compound is employed, the molar ratio of this electron-donor compound to the organoaluminium compounds is from 0.1 to 0.5.

The relative molar quantities of the organoaluminium compound which is employed as a cocatalyst, relative to the titanium compound present in the catalyst, may vary within a very wide range. For example, the atomic ratio Al/Ti may vary from 0.5 to 200.

By virtue of the catalyst of the present invention, the polymerization of olefins is carried out with an extremely high efficiency. In particular, in the polymerization of liquid propylene, the efficiency may be from 15 to 20 kg of polymer per gram of catalyst. The residual titanium and chlorine contents in a polymer of this kind are generally below 2 ppm and 100 ppm respectively. The crystallinity of the polypropylene thus obtained is very high, since the content of polymer insoluble in boiling n-heptane is equal to or higher than 96%, 95% or 94% by weight, when the melt index (MI5/190) of the polypropylene, measured at 190° C. under a weight of 5 kg, is 2, 6 or 10g/10 minutes, respectively.

Furthermore, it is advantageously observed that by virtue of the catalyst of the present invention, the development of each particle during the polymerization is uniform, with the result that polymer powders are obtained, consisting of spherical particles which can be easily handled and which have a high bulk density, particularly of between 0.40 and 0.50 g/ cm$^3$ in the case of polyethylene and polypropylene.

The catalyst is suitable for all the polymerization processes, especially the processes in gas phase and in suspension in a liquid olefin or in a hydrocarbon solvent. By virtue of the catalyst of the present invention it is possible to manufacture, under satisfactory industrial conditions, a large number of alpha-olefin polymers and copolymers of very reproducible quality, for example high-density polyethylenes (relative density above 0.940), among which ethylene homopolymers and co-polymers of ethylene and of alpha-olefins containing from 3 to 8 carbon atoms are prominent, low-density linear polyethylenes (relative density below 0.940), consisting of copolymers of ethylene and of one or more alpha-olefins containing from 3 to 8 carbon atoms, with a content of more than 85% of ethylene-derived units, elastomeric terpolymers of ethylene, propylene and dienes, elastomeric copolymers of ethylene and propylene, which have a weight content of ethylene-derived units of between approximately 30 and 70%, isotactic polypropylenes and copolymers of propylene and ethylene or other alpha-olefins, which have a weight content of propylene-derived units above 90%, and copolymers of propylene and of 1-butene which have a weight content of 1-butene-derived units of between 10 and 40%.

Method of determining the mass average (Dm) and the number average (Dn) particle diameters According to the invention, the mass average (Dm) and number average (Dn) diameters of support, catalyst, or polymer particles arc measured from microscopic observations, by means of the Optomax image analyser (Micro-Measurements Ltd., Great Britain). The principle of the measurement consists in obtaining, from the experimental study of a particle population, using optical microscopy, a frequency distribution table which gives the number ($n_i$) of particles belonging to each class (i) of diameters, each class (i) being characterized by an intermediate diameter ($d_i$) included between the boundaries of the said class. According to official French Standard NF X 11-630 of June 1981, Dm and Dn are given by the following formulae:

$$\text{mass average diameter: } Dm = \frac{n_i(d_i)^3 \, d_i}{n_i(d_i)^3}$$

$$\text{number average diameter: } Dn = \frac{n_i \cdot d_i}{n_i}$$

The ratio Dm/Dn characterizes the particle size distribution; it is sometimes called the "width of the particle size distribution". The measurement using the Optomax image analyser is carried out by means of an inverted microscope which permits the suspensions of particles of support, of catalyst, or of polymer to be examined at a magnification of between 16 and 200 times. A television camera picks up the images given by the inverted microscope and transmits them to a computer which analyzes the images received line by line and point by point on each line, with a view to determining the particle dimensions or diameters, and then classifying them.

The following examples, which do not imply any limitation, illustrate the invention.

EXAMPLE 1

Preparation of a catalyst 10.2 litres of a mixture containing 10 moles of dibutylmagnesium in n-hexane, 6.45 litres of n-hexane and, lastly, 1 litre of diisoamyl ether are introduced in succession during a first stage under nitrogen, at ambient temperature, into a 30 litre stainless steel reactor fitted with a stirring system rotating at the rate of 600 revolutions per minute and with a jacket. In a second stage, in which the speed of the stirring system is kept at 600 revolutions per minute and the reaction temperature at 25° C., 2.4 1 of tert-butyl chloride are added at a constant rate over 12 hours to the mixture thus obtained. At the end of this period, the reaction mixture is kept at 25° C. for 3 hours. The precipitate obtained is washed with 15 litres of n-hexane. Washing of the precipitate is repeated 6 times. The solid product obtained forms the preactivated support (A) based on magnesium chloride, containing 12 mol% of diisoamyl ether, relative to the magnesium chloride. When examined under a microscope, the preactivated support (A) is in the form of spherical particles which have a mass average diameter of 21 microns and an extremely narrow particle size distribution, such that the ratio Dm/Dn of the particles is equal to 1.4.

The specific surface of the preactivated support (A) is approximately 45 m²/g (BET). The structure of the magnesium chloride in the preactivated support is essentially amorphous and does not present characteristic X ray diffraction pattern in a powder.

EXAMPLE 2

Preparation of a catalyst

A suspension of the preactivated support (A) prepared previously in Example 1, containing moles of magnesium chloride in 6 litres of n-hexane, is introduced under nitrogen atmosphere into a 30-litre stainless steel reactor fitted with a stirring system rotating at 350 revolutions per minute. 18 litres of n-hexane are added to this suspension, which is kept stirred at ambient temperature (25° C.), followed, slowly over 30 minutes, by 0.365 litre of n-butanol. The suspension of activated support which is thus obtained is then kept stirred for one hour at 25° C. At the end of this period the stirring is stopped, the activated support is allowed to settle, the supernatant liquid phase is removed and the activated support is resuspended with stirring in 6 litres of n-hexane.

In a second stage, 10 litres of n-hexane are added to the last suspension of activated support, kept stirred at 25° C., followed, slowly over 30 minutes, by 0.46 litre of ethyl benzoate. The suspension of support thus treated is kept stirred for 1 hour at 25° C. At the end of this period, the stirring is stopped, the treated support is allowed to settle, the supernatant liquid phase is removed and the treated support is subjected to 3 successive washes using 20 litres of n-hexane at 25° C. each time, each washing consisting in keeping the suspension stirred for 15 minutes, then allowing the treated support to settle during 20 minutes, running off the supernatant liquid phase and resuspending the treated support. Finally, the treated support is resuspended in 6 litres of n-hexane.

In a third stage, 6 litres of titanium tetrachloride are added to the last suspension of treated support, kept stirred at 25° C. The suspension thus obtained is heated to 100° C. and is kept stirred at this temperature for 2 hours. At the end of this period the suspension of support thus impregnated is cooled with stirring to 50° C., then the stirring is stopped, the impregnated support is allowed to settle, the supernatant liquid phase is removed and the impregnated support is subjected to 3 successive washes, using 20 litres of n-hexane at 50° C. each time, and then 2 successive washes using 20 litres of n-hexane at 25° C. each time. The impregnated support (B) is finally resuspended in 6 litres of n-hexane at 25° C. It consists of spherical particles containing 6% of titanium atoms per atom of magnesium.

In a fourth stage, 9 litres of titanium tetrachloride are added to the last suspension of impregnated support (B), kept stirred at 25° C. The suspension thus obtained is heated to 100° C. and is kept stirred at this temperature for 2 hours. At the end of this period, the catalyst suspension thus obtained is cooled with stirring to 50° C., then the stirring is stopped, the catalyst is allowed to settle, the supernatant liquid phase is removed and the catalyst is subjected to 3 successive washes, using 20 litres of n-hexane at 50° C. each time, and then 4 successive washes, using 20 litres of n-hexane at 25° C. each time.

The catalyst (C) is isolated and stored under nitrogen atmosphere. It contains 6.5% of titanium atoms per atom of magnesium and consists of spherical particles which have a mass average diameter Dm of 21 microns, and a particle size distribution such that the ratio Dm/Dn of the particles is 1.4.

EXAMPLE 3 (COMPARATIVE)

Preparation of a catalyst

The procedure is exactly as in Example 2, except for the fact that the fourth stage is not carried out and that the impregnated support (B) obtained at the end of the third stage is employed as the catalyst.

EXAMPLE 4

Preparation of a catalyst

The procedure is exactly as in Example 2, except for the fact that a magnesium chloride support (D) containing only 1.5 mol% of diisoamyl ether relative to the magnesium chloride is employed instead of employing the preactivated support (A). The support (D) is exactly prepared as in Example 11 of EP-A-0,098,196. When examined under the microscope, the support (D) is in the form of spherical particles which have a mass average diameter of 20 microns and an extremely narrow particle size distribution, such that the ratio Dm/Dn of the particles is about 1.3.

The specific surface of the support (D) is approximately 40m²/g (BET).

A catalyst (E) containing 1.4% of titanium atoms per atom of magnesium is thus obtained.

EXAMPLE 5

Preparation of a catalyst

The procedure is exactly as in Example 2, except for the fact that 0.85 litre of diisobutyl phthalate is employed in the second stage, instead of employing 0.46 litre of ethyl benzoate.

A catalyst (F) containing 6% of titanium atoms per atom of magnesium is thus obtained. It consists of spherical particles which are identical in all respects with those of catalyst (C).

EXAMPLE 6

Polymerization in liquid propylene

A mixture containing 0.626 millimole of triethylaluminium, 0.313 millimole of diethylaluminium chloride and 0.313 millimole of methyl paratoluate, a quantity of catalyst containing 0.01 millimole of titanium, a volume of hydrogen corresponding to a partial hydrogen pressure of 0.2 MPa, and 700 g of liquid propylene is introduced, under nitrogen at 5° C., into a 2.2-litre stainless steel reactor fitted with a stirring device rotating at the rate of 350 revolutions per minute. The reactor is heated to 70° C. After 1.5 hours' reaction, a polypropylene powder is collected, whose characteristics appear in Table 1, as a function of the catalysts employed.

TABLE 1

| | Characteristics of the polymers obtained | | |
|---|---|---|---|
| Catalyst | C | B (Comparative) | E (Comparative) |
| Efficiency (kg polymer/g catalyst) | 18 | 6 | 2 |
| Residual chloride content (ppm) | 80 | 280 | 620 |

TABLE 1-continued

Characteristics of the polymers obtained

| Catalyst | C | B (Comparative) | E (Comparative) |
|---|---|---|---|
| Residual titanium content (ppm) | 1.4 | 5 | 3 |
| Content of polymer insoluble in boiling n-hexane (% by weight) | 95.5 | 95 | 91 |
| MI$_5$/190 (g/10 minutes) | 6 | 5 | 5 |
| Bulk density (g/cm$^3$) | 0.45 | 0.45 | 0.46 |
| Mass average diameter Dm, (microns) | 550 | 250 | 150 |
| Particle size distribution, Dm/Dn | 1.6 | 1.6 | 1.7 |

EXAMPLE 7

The procedure is exactly as in Example 6, except for the fact that catalyst (F) is employed instead of catalyst (C) and the fact that instead of employing the mixture containing triethylaluminium, diethylaluminium chloride and methyl paratoluate, a mixture containing 1 millimole of triethylaluminium and 0.2 millimole of phenyltriethoxysilane is employed. Furthermore, the partial hydrogen pressure, instead of being 0.2 MPa, is fixed at 0.10 MPa. Under these conditions, a polypropylene is obtained in the form of a powder which has the following characteristics:

efficiency: 15.6 kg polymer/g catalyst
residual chlorine content: 40 ppm
residual titanium content: 1.9 ppm
content of Polymer insoluble in boiling n-heptane: 94.9% by weight,
MI$_5$/190 : 14 g/10 minutes
bulk density : 0.43 g/cm$^3$
Dm : 450 microns
Dm/Dn : 1.6

EXAMPLE 8

Gas phase polymerization of propylene 60g of a polypropylene powder originating from a preceding reaction, which is perfectly inert and anhydrous, followed by a quantity of the catalyst (C) prepared in Example 2, containing 0.2 millimole of titanium, 6 millimoles of triethylaluminium, 3 millimoles of diethylaluminium chloride, 3 millimoles of methyl paratoluate and a volume of hydrogen corresponding to a partial pressure of 0.02 MPa are introduced under nitrogen atmosphere, into a 2.6-litre stainless steel reactor fitted with a stirring device for dry powder, rotating at the rate of 250 revolutions per minute. The reactor is heated to 50° C. and propylene is introduced into the reactor until a pressure of 0.30 MPa is obtained, and this is kept constant throughout the polymerization period by adding propylene. After 5 hours' reaction, 200 g of propylene have been produced in the form of a powder which has the following characteristics:

efficiency : 1.0 kg polymer/millimole of titanium
MI$_5$/190 : 11 g/10 minutes
content of polymer insoluble in boiling n-heptane : 93% by weight,
Bulk density : 0.45 g/cm$^3$
Dm : 150 microns
Dm/Dn : 1.6

EXAMPLE 9

Gas phase polymerization of ethylene 60g of a polyethylene powder originating from a preceding reaction, perfectly inert and anhydrous, followed by a quantity of the catalyst (C) prepared in Example 2, containing 0.1 millimole of titanium, 2.5 millimoles of triethylaluminium and a volume of hydrogen corresponding to a partial hydrogen pressure of 0.25 MPa are introduced under nitrogen atmosphere, into a 2.6-litre stainless steel reactor fitted with a stirring device for dry powder rotating at the rate of 250 revolutions per minute. The reactor is heated to 70° C. and ethylene is introduced into the reactor until a total pressure of 0.75 MPa is obtained, and this is kept constant throughout the polymerization period by adding ethylene. At the end of approximately 2 hours' reaction, 600 g of polyethylene have been produced in the form of a powder which has the following characteristics:

efficiency : 6 kg polymer/millimole of titanium
MI$_5$/190 : 1 g/10 minutes
Bulk density : 0.45 g/cm$^3$
Dm : 270 microns
Dm/Dn : 1.6

EXAMPLE 10

Gas phase copolymerization of propylene with 1-butene 608 of a powder of a copolymer of propylene and 1-butene originating from a preceding reaction, perfectly inert and anhydrous, followed by a quantity of the catalyst (C) prepared in Example 2, containing 0.2 millimole of titanium, 5 millimoles of triethylaluminium and 0.75 millimole of methyl paratoluate are introduced under nitrogen atmosphere, into a 2.6-litre stainless steel reactor fitted with a stirring device for dry powder, rotating at the rate of 250 revolutions per minute. The reactor is heated to 50° C. and a gaseous mixture of propylene and 1-butene in a ratio of 70/30 respectively by volume respectively is introduced therein until a pressure of 0.15 MPa is obtained, and this is kept constant throughout the polymerization period by adding this gaseous mixture. At the end of approximately 5 hours' reaction, 235 g of copolymer have been produced in the form of a powder which has the following characteristics:

efficiency : 1.2 kg copolymer/millimole of titanium
MI$_5$/190 : 4.6 g/10 minutes
weight content of 1-butene-derived units in the copolymer : 30%
Dm : 170 microns
Dm/Dn : 1.6

EXAMPLE 11

Gas phase copolymerization of ethylene with propylene 608 of a powder of a copolymer of ethylene and propylene originating from a preceding reaction, perfectly inert and anhydrous, followed by a quantity of the catalyst (C) prepared in Example 2, containing 100.05 millimole of titanium, 1.5 millimoles of triethylaluminium, 0.33 millimole of methyl paratoluate and a volume of hydrogen of 50 ml are introduced under nitrogen atmosphere, into a 2.6-litre stainless steel reactor fitted with a stirring device for dry powder, rotating at the rate of 250 revolutions per minute. The reactor is heated to 30° C. and a gaseous mixture of ethylene and propylene in a ratio of 50/50 by volume is introduced therein until a pressure of 2 MPa is obtained and this is kept constant throughout the polymerization period by adding this gaseous mixture. At the end of 2 hours' reaction, 210 g of copolymer have been produced in the form of a powder which has the following characteristics:

efficiency : 1.05 kg copolymer/millimole of titanium
$MI_5/190$ : 0.1g/10 minutes
weight content of ethylene-derived units in the copolymer : 49.5%
Dm : 150 microns
Dm/Dn : 1.6

EXAMPLE 12

Gas phase copolymerization of ethylene with propylene and 2-methyl-1,5-hexadiene 60g of a powder of a copolymer of ethylene, propylene and 2-methyl-1,5-hexadiene originating from a preceding reaction, perfectly inert and anhydrous, followed by a quantity of the catalyst (C) prepared in Example 2, containing 0.2 millimole of titanium and 5 millimoles of triethylaluminium are introduced under nitrogen atmosphere, into a 2.6-litre stainless steel reactor fitted with a stirring device for dry powder, rotating at the rate of 250 revolutions per minute. The reactor is heated to 20° C. and an equimolar mixture of ethylene and propylene is introduced therein for 6 hours at a steady rate of 30 g/h. 3.3 ml of 2-methyl-1,5-hexadiene are introduced at the beginning of the reaction, and then this said volume is introduced at the end of 2 hours' and at the end of 4 hours' reaction respectively. At the end of 6 hours' reaction, 130 g of copolymer have been produced in the form of a powder which has the following characteristics:

efficiency : 0.65 kg copolymer/millimole of titanium
$MI_5/190$ : 4 g/10 minutes
molar content of ethylene-derived units in the copolymer : 49.9%
molar content of 2-methyl-1,5-hexadiene-derived units in the copolymer : 0.8%
Dm : 170 microns
Dm/Dn : 1.7

EXAMPLE 13

Suspension copolymerization of ethylene with propylene in liquid propylene

A quantity of the catalyst (C) prepared in Example 2, containing 0.02 millimole of titanium, 1.6 millimoles of triethylaluminium and 0.75 millimole of methyl paratoluate is introduced under nitrogen into a 2-litre stainless steel reactor fitted with a stirring system rotating at 350 revolutions per minute. The reactor is cooled to 0° C. and 500 g of liquid propylene and a quantity of ethylene such that the partial ethylene pressure is 0.3 MPa are introduced therein. The reactor temperature is fixed at 5° C. and after 90 minutes' copolymerization, 150 g of a copolymer powder which has the following characteristics are collected:

efficiency : 7.5 kg copolymer/millimole of titanium
viscosity average molar mass : $1.2 \times 10^6$
weight content of ethylene-derived units in the copolymer : 42%
Dm : 290 microns
Dm/Dn : 1.6

EXAMPLE 14

Suspension copolymerization of ethylene with propylene in n-hexane 2 litres of n-hexane, a quantity of the catalyst (C) prepared in Example 2, containing 0.1 millimole of titanium, 5 millimoles of triethylaluminium and 1 millimole of methyl paratoluate are introduced under nitrogen into a 2-litre stainless steel reactor fitted with a stirring system rotating at 350 revolutions per minute. The reactor is heated to 70° C. and a gaseous mixture of ethylene and propylene in a ratio 60/40 respectively by volume respectively is introduced therein at a steady rate of 130 g/h for 1 hour. At the and of this period, 120 g of copolymer are collected in the form of a powder which has the following characteristics:

efficiency : 1.2 kg copolymer/millimole of titanium
viscosity average molar mass : $2 \times 10^5$
weight content of ethylene-derived units in the copolymer : 54%
Dm : 160 microns
Dm/Dn : 1.6

EXAMPLE 15

Suspension copolymerization of ethylene with propylene in n-hexane

The procedure is exactly as in Example 14, except for the fact that instead of the reactor being heated to 70° C., it is cooled to 3.5° C. At the end of 1 hours' reaction, 70 g of copolymer are collected in the form of a powder which has the following characteristics:

efficiency : 0.7 kg copolymer/millimole of titanium
weight content of ethylene-derived units in the copolymer : 84%
Dm : 140 microns
Dm/Dn : 1.6

EXAMPLE 16

Suspension copolymerization of ethylene with propylene and 4-methyl-1,4-hexadiene in n-hexane 1 litre of n-hexane, a quantity of the catalyst (C) prepared in Example 2, containing 0.2 millimole of titanium and 5 millimoles of triethylaluminium are introduced under nitrogen into a 3-litre stainless steel reactor fitted with a stirring system rotating at 250 revolutions/minute. The reactor is heated to 70° C. and an equimolar gaseous mixture of ethylene and propylene is introduced therein for 1.5 hours at a steady rate of 60 g/h. 3.3 ml of 4-methyl-1,4-hexadiene are introduced into the reactor, and then this same volume is introduced at the end of 0.5 hour and at the end of 1 hours' reaction respectively. After 1.5 hours' reaction, 75 g of copolymer are collected in the form of a powder which has the following characteristics:

efficiency : 0.375 kg copolymer/millimole of titanium
weight average molecular mass : $9 \times 10^4$
molar content of ethylene-derived units in the copolymer : 47.6%
molar content of 4-methyl-1,4-hexadiene-derived units in the copolymer : 0.7%
Dm : 110 microns
Dm/Dn : 1.6.

EXAMPLE 17

Gas Phase Copolymerization of Ethylene with 1-Butene 60 g of a powder of a copolymer of ethylene and 1-butene originating from a preceding reaction, perfectly inert and anhydrous, followed by a quantity of the catalyst (C) prepared in Example 2, containing 0.05 millimole of titanium and 3.5 millimole of triisobutyl aluminium are introduced under nitrogen atmosphere, into a 2.6 litre stainless steel reactor fitted with a stirring device for dry powder, rotating at the rate of 250 revolutions per minute. The reactor is heated to 70° C. and a gaseous mixture containing by volume 70% of ethylene, 10% of 1-butene and 20% of hydrogen is introduced into the reactor, so that the total pressure the reactor is 1.3 MPa and is kept constant during the whole copolymerization. After 5 hours of copolymerization, 1.05 kg of copolymer of ethylene with 1-butene is produced, in the form of a powder which has the following characteristics:

efficiency : 21 kg copolymer/millimole of titanium
density : 0.902
$MI_5/190$ : 1g/10 minutes
weight content of 1-butene-derived units in the copolymer : 8.5%
Dm : 500 microns
Bulk density : 0.49 g/cm$^3$

We claim:

1. Catalyst of the Ziegler-Natta type, capable of being applied to the polymerization of olefins, comprising a preactivated support containing from 80 to 95 mol% of magnesium chloride and from 5 to 20 mol% of at least one electron-donor compound, $D_1$, containing no labile hydrogen and no ester function and consisting of spherical particles which have a mass average diameter of 10 to 100 microns and a particle size distribution such that the ratio of the mass average diameter, Dm, to the number average diameter, Dn, is below 2, and characterized in that the catalyst containing from 4 to 12% of titanium atoms per atom of magnesium is prepared by a process comprising:
    (a) treating the said preactivated support by placing it in contact with at least one electron-donor compound $D_2$ containing labile hydrogen,
    (b) impregnating the support thus treated by placing it in contact with titanium tetrachloride, then washing the impregnated support with liquid hydrocarbon and,
    (c) subjecting the support thus impregnated and thus washed to a treatment of activation which consists in placing it in contact with titanium tetrachloride.

2. Catalyst according to claim 1, characterized in that it contains from 5 to 10% of titanium atoms per atom of magnesium.

3. The catalyst of claim 1 prepared by a process comprising treating said support by placing it in contact with at least one ester of an aromatic carboxylic acid.

4. Process for preparing the catalyst according to claim 1, comprising the successive stages which consist in:
    (a) treating the preactivated support by placing it in contact of at least one electron-donor compound $D_2$ containing labile hydrogen, in a quantity of between 0.2 and 1.2 moles per mole of magnesium chloride in order to obtain an activated support,
    (b) impregnating the support thus treated by placing it in contact with titanium tetrachloride in a quantity of between 1 and 25 moles per mole of magnesium chloride, then washing the impregnated support with liquid hydrocarbon, and
    (c) subjecting the support thus impregnated and thus washed to a treatment of activation which consists in placing it in contact with titanium tetrachloride in a quantity of between 1 and 25 moles per mole of magnesium chloride.

5. Process according to claim 3 wherein the electron-donor compound containing labile hydrogen, $D_2$, is selected from the group consisting of water, alcohols and phenols.

6. The process of claim 4 and including treating the said activated support by placing it in contact with at least one ester of an aromatic carboxylic acid in a quantity of between 0.1 and 1.0 mole per mole of magnesium chloride.

7. Preactivated support for catalysts for the polymerisation of olefins containing from 80 to 95 mol % of magnesium chloride and from 5 to 20 mol % of an electron-donor compound, $D_1$, free from labile hydrogen and from ester function, and consisting of spherical particles which have a mass average diameter of 10 to 100 microns and a narrow particle size distribution, such that the ratio of the mean average diameter, Dm, to the number average diameter, Dn, is below 2.

8. Preactivated support according to claim 7, characterised in that it has a specific surface area of 20 to 100 m$^2$/g (BET).

9. Preactivated support according to claim 7, characterised in that the electron-donor compound, $D_1$, is selected from the group consisting of ethers, sulphones, sulphoxides, thioethers, amines, amides and phosphines.

10. Process for preparing the preactivated support according to claim 7, by reacting in a liquid hydrocarbon medium (a) a dialkyl magnesium of formula $R_1MgR_2$ in which $R_1$ and $R_2$ are identical or different alkyl radicals having from 2 to 12 carbon atoms, soluble in the liquid hydrocarbon medium, with (b) an alkyl chloride of formula $R_3Cl$ in which $R_3$ is a secondary or tertiary alkyl radical having from 3 to 12 carbon atoms, in a molar ratio $R_3Cl/R_1MgR_2$ from 1.5 to 2.5, in the presence of an electron-donor compound, $D_1$, free from labile hydrogen and from ester function, process characterised in that the molar ratio $D_1/R_1MgR_2$ is from 0.1 to 1.2 and the reaction takes place by contacting $R_1MgR_2$, $R_3Cl$ and $D_1$ over a period of at least 10 hours, with stirring in a liquid hydrocarbon medium at a temperature from 10° to 45° C.

* * * * *

UNITED STATES PATENT AND TRADEMARK OFFICE
CERTIFICATE OF CORRECTION

PATENT NO. : 4,960,741

DATED : October 2, 1990

INVENTOR(S) : JEAN-CLAUDE A. BAILLY et al

It is certified that error appears in the above-identified patent and that said Letters Patent is hereby corrected as shown below:

Col. 1, l. 4, correct spelling of the word "supported"

Col. 3, l. 38, there should be a semicolon (;), not a colon, after the word "noted"

Col. 6, l. 3, should read "may be performed"

Col. 6, l. 63, should read "and the particle size"

Col. 8, l. 10, should read "polymer particles are"

Col. 8, l. 46, should read "Example 1 - Preparation of a preactivated support"

Col. 9, l. 13, should read "containing 4 moles of"

Col. 10, l. 15, should read "Example 4 (Comparative)-

Col. 12, l. 29, should read "60g of a powder"

Col. 14, l. 15, should read "At the end of this period,"

Col. 15, l. 3-4, "Gas Phase Copolymerization of Ethylene with 1-Butene" should be indicated as the title.

UNITED STATES PATENT AND TRADEMARK OFFICE
CERTIFICATE OF CORRECTION

PATENT NO. : 4,960,741

DATED : October 2, 1990

INVENTOR(S) : JEAN-CLAUDE A. BAILLY et al.

It is certified that error appears in the above-identified patent and that said Letters Patent is hereby corrected as shown below:

Col. 15, line 15, should read "total pressure in the"

Signed and Sealed this

Seventh Day of April, 1992

*Attest:*

HARRY F. MANBECK, JR.

*Attesting Officer*  *Commissioner of Patents and Trademarks*